Patented June 17, 1947

2,422,472

UNITED STATES PATENT OFFICE 2,422,472

GLASS ARTICLE

Robert H. Dalton, Corning, N. Y., assignor to Corning Glass Works, Corning, N. Y., a corporation of New York No Drawing. Original application March 31, 1941, Serial No. 386,190. Divided and this application September 10, 1942, Serial No. 457,884

3 Claims. (Cl. 49—92)

This invention relates to glass and methods of producing color therein and more particularly to methods of treating copper containing glasses, and is a division of my co-pending application Serial No. 386,190 filed March 31, 1941, for "Glass article and method of making it" which issued August 3, 1943, as Patent No. 2,326,012.

In oxidized glasses, that is, glasses resulting from the melting of batches containing an oxidizing agent or agents, copper produces a green or bluish green color. In such glasses it is the generally accepted belief that the copper is in true solution in the form of a copper silicate. When such glasses are melted reducingly through the use of reducing agents in the batch they are, provided the copper content be sufficiently low, substantially colorless, particularly if cooled rapidly, but under proper conditions they will become red when they are reheated. Under these circumstances the glasses are believed to contain colloidal copper or cuprous oxide and are referred to in general as copper ruby glasses. The tendency of copper ruby glasses to develop color varies with composition, with the rate of cooling of the glass when fabricated into ware and with the time and temperature of heat treatment. A composition containing a small amount of tin oxide is more heat sensitive than one containing no tin oxide.

One object of this invention is to increase the sensitivity to reheating of reduced copper containing glasses.

Another object is to render such glasses selectively heat sensitive whereby an article thereof has certain portions which are more sensitive to reheating than other portions, thereby permitting the production of a design in the glass.

A further object is to produce a glass article composed throughout of a single copper containing glass which is selectively colored.

Another object is to prevent opalescence in copper ruby glasses due to the formation of too coarse a colloid.

Still another object is to produce colored glass fibres.

Another object is to produce photographic images in glass.

To these and other ends the invention includes the articles and methods to be hereinafter more fully described and claimed.

I have discovered that exposure to short wave radiations will increase the heat sensitivity of reduced copper ruby glasses while in the colorless state. In other words, if such glasses are thus irradiated with a quartz mercury arc, for example, the coloration due to heat treatment will thereafter occur at a lower temperature and/or in a shorter time than it otherwise would and glasses which would not normally become colored will, when so irradiated, develop coloration on heat treatment.

The initial effect of irradiation in some cases is the development of a blue color in the irradiated portion of the glass without the application of heat. This is not believed to be due to copper in the ordinary oxidized state since the spectral characteristics of the irradiated glass are quite different from those of an oxidized copper-containing glass.

When the irradiated glass is subsequently heated to a temperature in the neighborhood of its annealing temperature, the irradiated portion acquires the red color characteristics of copper ruby glasses, especially if the glass contains a substantial amount of tin oxide. However, the initial development of the blue color is independent of the presence of tin in the glass.

In practicing the invention a glass batch containing copper equivalent to at least .05% $CuO$ in the finished glass and containing a reducing agent and preferably also a small amount of tin oxide is melted and fabricated in the usual manner. The glass article is then irradiated preferably by means of a mercury arc for the proper length of time which may readily be determined by trial. In general, the time required will be shorter as the copper content of the glass is increased, but with too high copper content it may be difficult to retain the glass in the initial colorless state on cooling, particularly in the case of thick ware wherein the retention of heat on cooling may furnish the heat treatment required to develop the color. With thin ware or articles which can be cooled rapidly, relatively high copper contents can be used and the time of irradiation thereby shortened. For example, glass fibres containing about 1% of $Cu_2O$ which are initially colorless, on being irradiated for ten seconds or more, become light blue and on subsequent heat treatment become red. Without being irradiated no color can be obtained by the heat treatment, because oxidation by the air takes place before the color can develop.

Reduced copper containing glass in the colorless state fluoresces in ultra-violet light. Continuous exposure will gradually diminish such fluorescence and, if the glass is subsequently heated until the ruby color develops, the ability to fluoresce is largely destroyed. In other words, it appears that the ability to fluoresce is characteristic of the copper only while in a state of solution in the glass and not when it is in the ruby colored colloidal state.

In an article in which only a portion of the glass was irradiated the development of the red coloration in the irradiated portion occurs before the unexposed portion is affected. By shielding selected portions of the article from the radiations, only those parts which were exposed become colored and hence designs may be produced on the article which may be blue or red, depending on whether the irradiation is followed by a heat treatment. Cloth made of glass fibres can be provided with a variety of designs after it is fabricated, such designs being blue and/or red in color as above described. The article to be treated may consist of a flashed glass, that is, one comprising a thin layer of a copper-containing glass fused to another glass.

Inasmuch as the time required for the irradiation varies with the type of glass as well as with the copper content, a time suitable for all glasses cannot be stated but for an individual glass it can readily be determined by trial. Glasses which do not readily develop color in heat treatment are particularly suitable for the production of designs in accordance with the invention because even relatively thick pieces can be obtained in the colorless state without resorting to a special chilling technique. Moreover, since the effect of irradiation depends on the action of short wave radiations, for example, ultra-violet light, on the copper contained in the glass, it is an advantage to use a glass which at least partially transmits such radiation.

Without limiting the invention thereto, the following batches are given as examples of glasses which may be employed:

|  | 1 | 2 | 3 | 4 |
|---|---|---|---|---|
| Sand | 330 | 330 | 330 | 330 |
| Sodium carbonate | 139 | 139 | 139 | 139 |
| Hydrated alumina | 10.5 | 10.5 | 10.5 | 10.5 |
| Hydrated lime | 52 | 52 | 52 | 52 |
| Copper suboxide | 0.5 | 0.5 | 0.5 | 5.0 |
| Sodium cyanide | 3.8 | 3.8 | | |
| Stannic oxide | | 1.2 | 1.2 | 1.2 |
| Abietic acid | | | 2.5 | 10 |

In the above batches sodium cyanide and abietic acid are used as reducing agents. Other known reducing agents may be employed. Batch 1 which contains no tin is suitable for the production of a blue coloration by irradiation but does not develop a satisfactory red coloration when subsequently reheated. Batches 2, 3 and 4 are suitable for the production of both red and blue colorations. Batch 4 is particularly suitable for use for glass fibres and thin walled articles.

By means of the invention photographs may be reproduced in the glass by employing a photographic negative capable of transmitting the active radiation and printing through the same on the glass. This process can be effectively carried out by coating a copper-containing glass directly with a photographic emulsion similar to that used on a Schumann plate, making a negative on this emulsion in the conventional manner, irradiating the glass through this negative as previously described, removing the emulsion, and heat treating the glass to develop a ruby colored image therein. Insofar as I know, irradiation is the only method which will produce in the above described glasses a latent image capable of being developed by subsequently heating the glass. In the absence of a more appropriate term, the word irradiated is used in the claims to define the glass article containing such a latent image.

It is also possible to produce an image directly in the glass by illuminating an object with short wave radiation, focusing the image thereof on the glass and subsequently heat treating to develop the color.

In general, copper containing glasses irradiated by my method have less tendency for the color to develop with an opalescent or clouded appearance than similar glasses colored without preliminary irradiation.

I claim:

1. An article composed throughout of a single glass containing copper equivalent to at least .05% $Cu_2O$ and having a heat stable picture exhibiting photographic detail formed in the glass in various shades of color of one hue.

2. An article comprising a reduced glass containing throughout a reduction product of CuO by means of which predetermined parts of the glass are colored blue, the remainder of the glass being substantially colorless, the colored parts forming a photographic image within the glass mass.

3. An article comprising a substantially colorless reduced glass containing an irradiated reduction product of CuO and having within its mass a predetermined, latent, photographic image capable of being developed as a permanent red coloration in a clorless glass body by uniformly heating the entire glass body.

ROBERT H. DALTON.

REFERENCES CITED

The following references are of record in the file of this patent:

UNITED STATES PATENTS

| Number | Name | Date |
|---|---|---|
| 1,169,571 | Rosenthal | Jan. 25, 1916 |
| 10,446 | Locke | Feb. 5, 1884 |
| 366,364 | Atterbury | July 12, 1887 |
| 2,314,804 | Willson | Mar. 23, 1943 |
| 282,002 | Locke | July 24, 1883 |
| 402,090 | Leighton | Apr. 23, 1889 |
| 2,075,446 | Leibig | Mar. 30, 1937 |
| 2,326,012 | Dalton | Aug. 3, 1943 |

FOREIGN PATENTS

| Number | Country | Date |
|---|---|---|
| 4,881 | Great Britain | 1878 |
| 4,880 | Great Britain | 1878 |